(12) United States Patent  
Yang

(10) Patent No.: US 8,564,722 B2  
(45) Date of Patent: Oct. 22, 2013

(54) HORIZONTAL SYNCHRONIZATION SIGNAL DETECTION SYSTEM AND METHOD

(75) Inventor: Fang-Ming Yang, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 251 days.

(21) Appl. No.: 13/239,519

(22) Filed: Sep. 22, 2011

(65) Prior Publication Data

US 2012/0236203 A1    Sep. 20, 2012

(30) Foreign Application Priority Data

Mar. 17, 2011  (TW) .............................. 100109151 A

(51) Int. Cl.  
*H04N 5/10*  (2006.01)  
*H04N 5/06*  (2006.01)

(52) U.S. Cl.  
USPC ........... 348/531; 348/540; 348/530; 348/521; 348/525

(58) Field of Classification Search  
USPC ......... 348/500, 521, 525, 530, 531, 540, 536, 348/537, 452.4; 375/354, 357  
See application file for complete search history.

(56) References Cited

U.S. PATENT DOCUMENTS

| | | | |
|---|---|---|---|
| 5,844,622 A * | 12/1998 | Hulvey | 348/546 |
| 6,028,642 A * | 2/2000 | Rinaldi et al. | 348/540 |
| 2006/0158553 A1 | 7/2006 | Sakurai | |
| 2006/0170821 A1 | 8/2006 | Lim et al. | |

* cited by examiner

*Primary Examiner* — Jefferey Harold  
*Assistant Examiner* — Jean W Desir  
(74) *Attorney, Agent, or Firm* — Bacon & Thomas, PLLC

(57) ABSTRACT

A horizontal synchronization signal detection system includes a coarse period estimator and a fine period time estimator. The coarse period estimator estimates a minimum value and corresponding position of each period of a CVBS signal to calculate a coarse period of a horizontal synchronization signal. The fine period time estimator divides the horizontal synchronization signal into a first part and a second part so as to generate a first sum and a second sum by adding signals of the first part and the second part, and detects a middle point of the horizontal synchronization signal when the first sum equals the second sum. The steps of fine-tuning the coarse period to generate a fine-tuned coarse period, extracting the horizontal synchronization signal according to the fine-tuned coarse period, and determining whether the first sum is equal to the second sum are repeatedly executed until the first sum equals the second sum.

8 Claims, 9 Drawing Sheets

HORIZONTAL SYNCHRONIZATION SIGNAL DETECTION SYSTEM AND METHOD

CROSS REFERENCE TO RELATED APPLICATION

This application claims the benefits of the Taiwan Patent Application Serial Number 100109151, filed on Mar. 17, 2011, the subject matter of which is incorporated herein by reference.

BACKGROUND OF THE INVENTION

1. Field of the Invention

The present invention relates to the technical field of timing synchronization and, more particularly, to a horizontal synchronization signal detection system and method.

2. Description of Related Art

Color video burst signal (CVBS) is an NTSC-defined television (TV) transmission signal. FIG. 1 is a schematic view illustrating a typical analog CVBS signal 10. As shown in FIG. 1, the analog CVBS signal 10 includes a front porch 11, a horizontal synchronization (Hsync) pulse 12, a back porch 13, a color video burst 13a, and an active line 14. The Hsync pulse 12 indicates the start portion for each line of the video information. Each Hsync pulse 12 starts with the front porch 11 and ends at the back porch 13. The color video burst 13a is used in various video formats (such as NTSC and PAL) as reference for chrominance signal.

Each line of the analog CVBS signal 10 starts with the falling edge of an Hsync pulse 12 and ends with the falling edge of a next Hsync pulse 12. According to the standard video specification, the level for the front porch 11 and the back porch 13 is referred to as a blanking level (BL), which is 0V. The level (or amplitude) of the Hsync pulse 12 is referred to as a synchronization level (SL), which is a DC level smaller than the BL. The falling and rising edges of the Hsync pulse 12 are defined according to the DC slice level, which is typically 50% of the amplitude of the Hsync pulse.

Currently, various video processing systems and methods have been developed to process the video signal (as shown in FIG. 1) for obtaining video and timing information, so as to drive a display system. For accurately displaying corresponding frames, it requires precisely detecting vertical and horizontal synchronization signals to thereby correctly identify the segmented data frames, and produce and display the line information of each video data frame.

FIG. 2 is a system block diagram of a typical synchronization detector 120. The detector 120 includes a slicer 121, a slice generator 122, a phase detector 123, a phase locked loop (PLL) 124, and a controller 125 to control the aforementioned devices. In general, the slicer 121 detects the rising and falling edges of each Hsync signal of an input video signal 10 based on a DC slice level generated by the slice generator 122. The slice generator 122 uses existing technique to process the input video signal 10 to thereby decide the DC slice level. For example, the DC slice level can be decided according to the DC amplitudes, transformations, and structures of portions of the input video signal or according to the relative amplitude between the Hsync pulse and another level (such as the peak of the BL or active line).

According to the DC slice level determined by the slice generator 122, the slicer 121 can detect the falling edge of the Hsync pulse 12 of the video signal 10 at a point under the determined DC slice level as the level of the input video signal is moved the point. Similarly, the slicer 121 can detect the rising edge of the Hsync pulse 12 of the video signal 10 at a point above the determined DC slice level as the level of the input video signal is moved the point. Namely, when the level (amplitude) of the input video signal 10 is moved to be smaller than the DC slice level, it indicates that the Hsync pulse 12 is detected.

The PLL 124 can generate and output the Hsync pulse 12. The phase detector 123 detects a phase difference between the Hsync pulses extracted from the input video signal 10 by the slicer 121 and outputted by the PLL 124, and thus generates a control signal. The phase difference makes the PLL 124 execute an error correction to adjust the outputted Hsync pulse.

However, such an Hsync detection can affect the level of the input video signal 10 due to the noise interference of the system of FIG. 2, and the level or amplitude of the Hsync pulse 12 is also changed, resulting in that the accuracy of the Hsync detection is decreased. In addition, the signal transmission may cause the deformation or loss of the input video signal, which further makes the Hsync detection more difficult.

US Publication No. 2006/0158553 entitled "Synchronous detector", which is incorporated by reference herein, has disclosed a horizontal synchronous detector to detect an input video signal and generate a horizontal synchronization level HL for use as a threshold of Hsync signal detection. US Publication No. 2006/0170821 entitled "Digital video processing systems and methods for estimating horizontal sync in digital video signals", which is incorporated by reference herein, has disclosed a modulus converter to convert an input video signal into a digital input video signal and a digital low pass filter to filter the digital input video signal and generate a threshold THV for use as a level comparison signal for detecting an Hsync signal.

The above schemes use a threshold as a level comparison signal of Hsync detection, but the level of an input video signal is frequently changed due to the noise interference. Therefore, the level comparison schemes in the existing techniques are possibly unable to accurately detect Hsync signal or even unable to detect any Hsync signal, or erroneously take other portions of an input video signal as the Hsync signal.

Therefore, it is desirable to provide an improved horizontal synchronization signal detection system and method to mitigate and/or obviate the aforementioned problems.

SUMMARY OF THE INVENTION

The object of the present invention is to provide a horizontal synchronization signal detection system and method for accurately detecting the position of a horizontal synchronization signal.

In one aspect of the invention, there is provided a horizontal synchronization signal detection system, which comprises: a coarse period estimator for receiving a CVBS signal and estimating a minimum value and corresponding position of each period of the CVBS signal to calculate a coarse period of a horizontal synchronization signal; and a fine period time estimator for receiving the coarse period of the horizontal synchronization signal and dividing the horizontal synchronization signal into first signals in a first part and second signals in a second part so as to add the first signals to generate a first sum and to add the second signals to generate a second sum, wherein a signal accumulation time of each part is half of a time length of the horizontal synchronization signal; the fine period time estimator detects a middle point of the horizontal synchronization signal when the first sum is equal to the second sum; when the first sum minus the second sum is not equal to zero, the steps of fine-tuning the coarse period to generate a fine-tuned coarse period, extracting the horizontal synchronization signal according to the fine-tuned coarse period, and determining whether the first sum is equal to the second sum are repeatedly executed until the first sum is equal to the second sum for indicating that the middle point of the horizontal synchronization signal is detected.

In another aspect of the invention, there is provided a horizontal synchronization signal detection method, which comprises the steps of: receiving a CVBS signal and estimating a minimum value and corresponding position of each period of the CVBS signal so as to calculate a coarse period of a horizontal synchronization signal; and receiving the coarse period of the horizontal synchronization signal and dividing the horizontal synchronization signal into first signals in a first part and second signals in a second part, and adding the first signals to generate a first sum and adding the second signals to generate a second sum, wherein time of accumulating the first signals is a half of time of the horizontal synchronization signal; a middle point of the horizontal synchronization signal is detected when the first sum is equal to the second sum; when the first sum minus the second sum is not equal to zero, steps of fine-tuning the coarse period to generate a fine-tuned coarse period, extracting the horizontal synchronization signal according to the fine-tuned coarse period, and determining whether the first sum is equal to the second sum are repeatedly executed until the first sum is equal to the second sum for indicating that the middle point of the horizontal synchronization signal is located.

Other objects, advantages, and novel features of the invention will become more apparent from the following detailed description when taken in conjunction with the accompanying drawings.

DETAILED DESCRIPTION OF THE PREFERRED EMBODIMENT

Reference will now be made in detail to present embodiments of the present invention, examples of which are illustrated in the accompanying drawings. Wherever possible, the same reference numbers will be used throughout the drawings to refer to the same or like parts.

Figure 1:
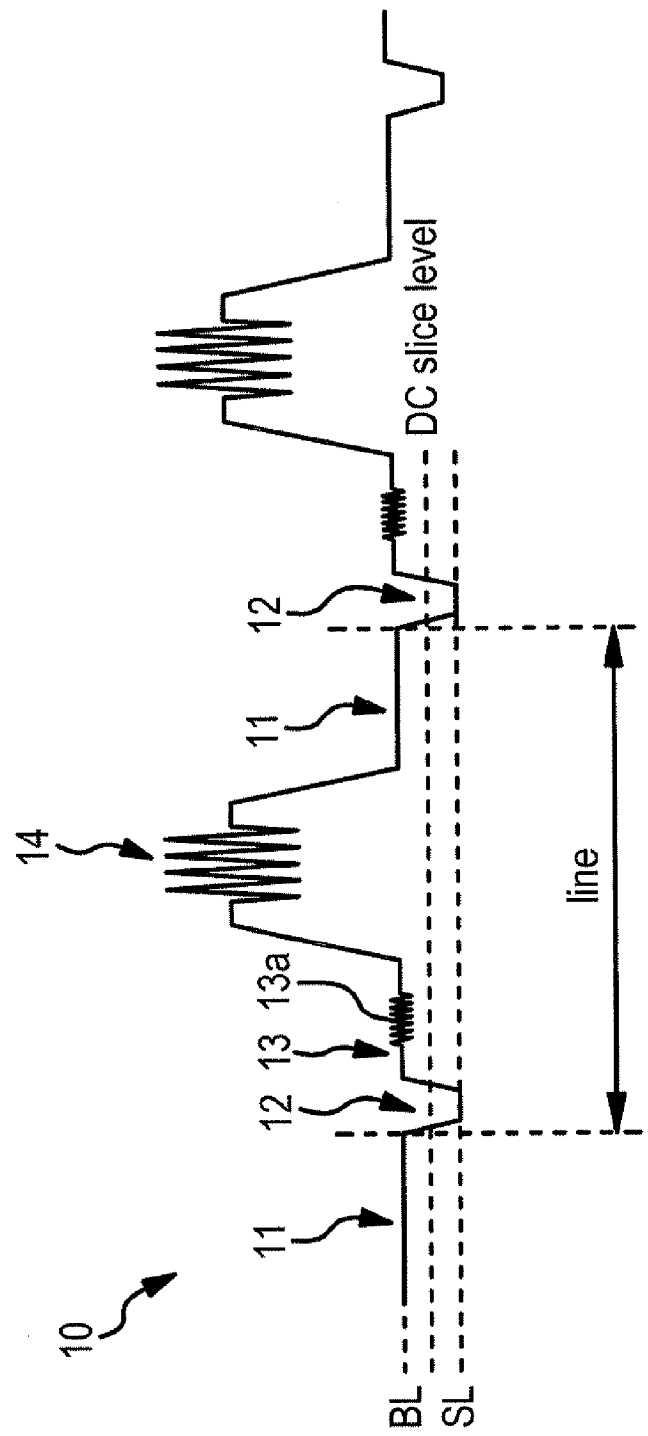
FIG. 1 is a schematic view of a typical analog CVBS signal.
Figure 2:
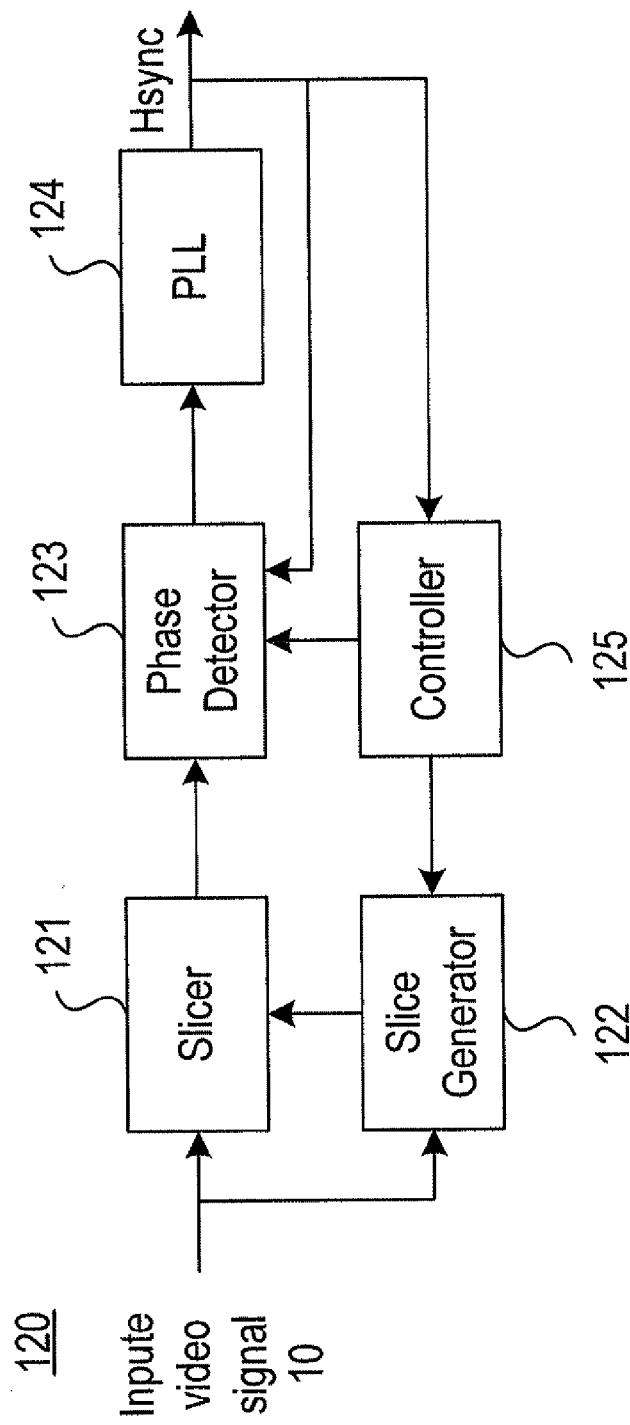
FIG. 2 is a system block diagram of a typical synchronization detector.
Figure 3:
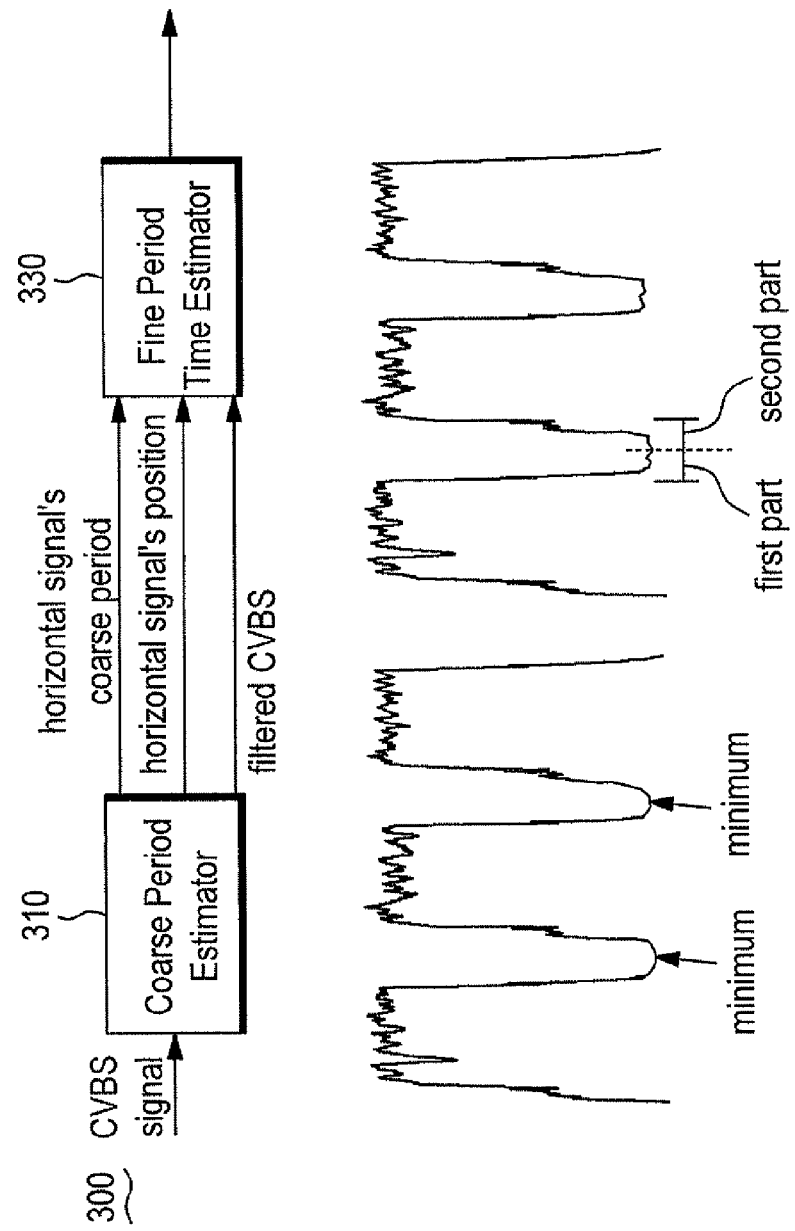
FIG. 3 is a schematic view illustrating a horizontal synchronization signal detection system and associated detection principle according to an embodiment of the invention.

The invention relates to a horizontal synchronization signal detection system and method. FIG. 3 is a schematic diagram of the horizontal synchronization detection system 300 for describing its detection principle in accordance with a preferred embodiment of the invention. In FIG. 3, the system 300 includes a coarse period estimator 310 and a fine period time estimator 330.

The coarse period estimator 310 receives the CVBS signal and, due to the horizontal synchronization signal of the CVBS signal being featured with having periodicity and minimum value, estimates the minimum value and labels the corresponding position in each period, so as to calculate a coarse period of a horizontal synchronization signal.

The fine period time estimator 330 receives the coarse period of the horizontal synchronization signal and divides the horizontal synchronization signal into a first part and a second part. The fine period estimator sums signals of the first part to generate a first sum and sums signals of the second part to generate a second sum. When the first sum is equal to the second sum, it indicates that the middle point of the horizontal synchronization signal is detected.

Figure 4:
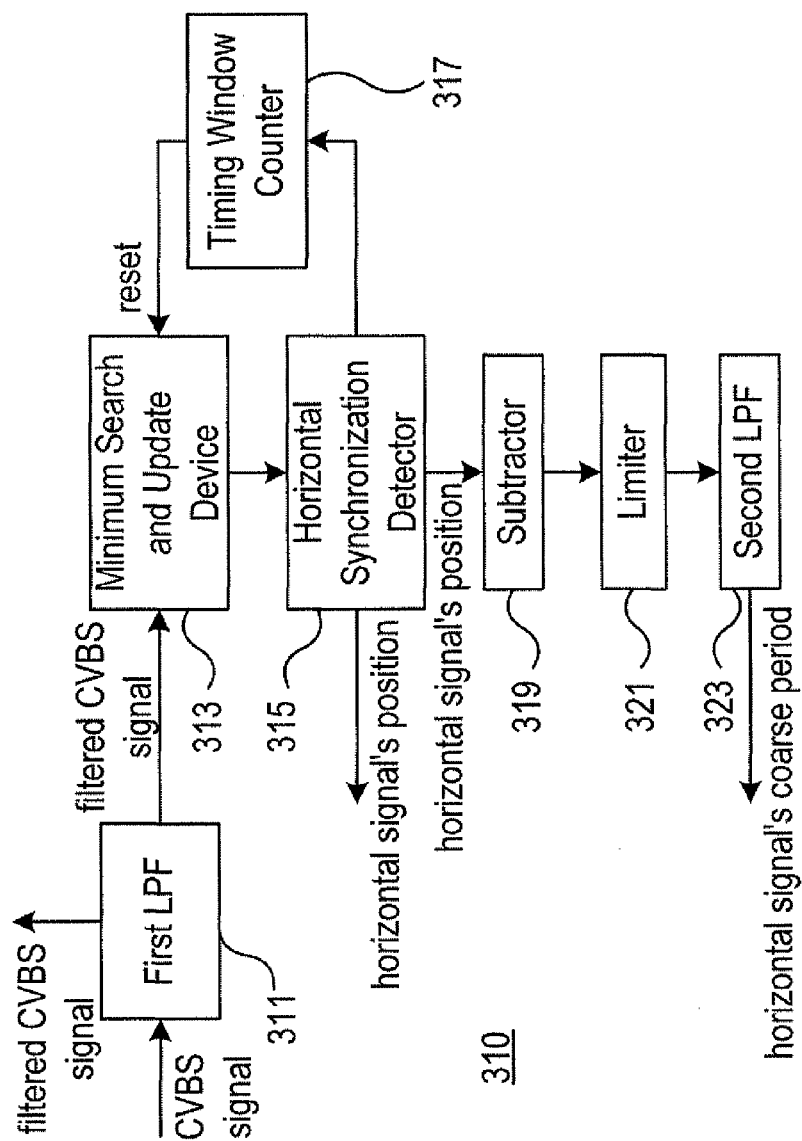
FIG. 4 is a block diagram of a coarse period estimator according to an embodiment of the invention.

FIG. 4 is a block diagram of the coarse period estimator 310 in accordance with a preferred embodiment of the invention. In FIG. 4, the coarse period estimator 310 includes a first low-pass filter (LPF) 311, a minimum search and update device 313, a horizontal synchronization detector 315, a timing window counter 317, a subtractor 319, a limiter 321, and a second low-pass filter 323.

Figure 5:
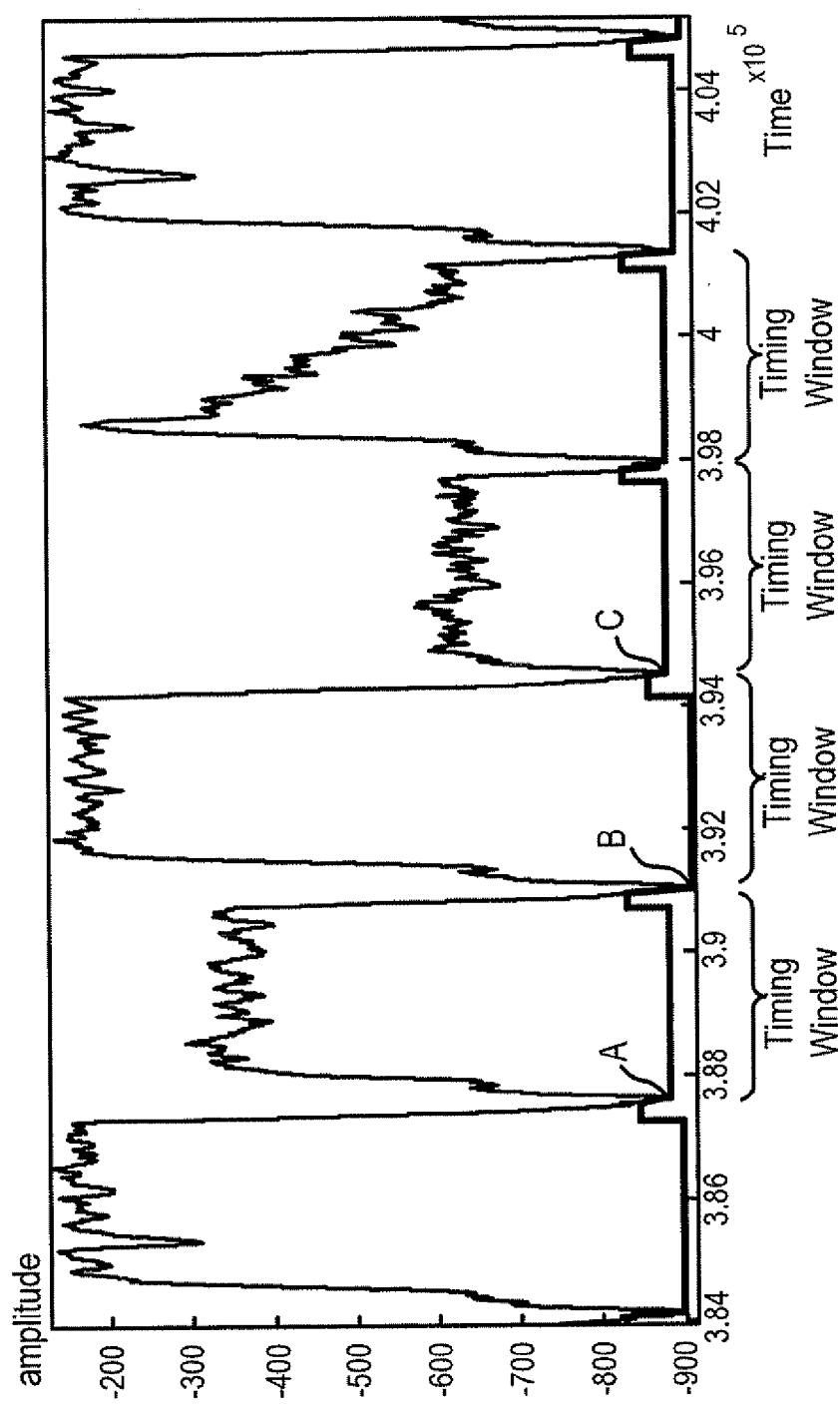
FIG. 5 is a schematic view of a filtered CVBS signal according to an embodiment of the invention.

The first LPF 311 filters the CVBS signal to thereby generate a filtered CVBS signal. FIG. 5 is a schematic view illustrating the filtered CVBS signal in accordance with a preferred embodiment of the invention, where the horizontal axis indicates time and the vertical axis indicates amplitude of the filtered CVBS signal.

The minimum search and update device 313 is connected to the first LPF 311. Before starting to search the filtered CVBS signal, the minimum search and update device 313 pre-searches the filtered CVBS for a period of time, to thereby find a minimum value. The period of time is selected according to the experience of those skilled in the art, which is, for example, a multiple of period defined by the horizontal synchronization signal specification. The minimum value is added with a constant for use as a threshold Th1. The constant is selected according to the experience of those skilled in the art. A timing window is opened from the position with the minimum value, and a minimum value of the filtered CVBS signal in the timing window is searched. The timing window is set to be slightly greater than the period defined by the horizontal synchronization signal specification.

When the minimum value in the timing window is smaller than the threshold Th1, the minimum search and update device 313 updates the minimum value in the timing window as a new minimum value and adds a constant to the new minimum value for use as a new threshold Th1.

The horizontal synchronization detector 315 is connected to the minimum search and update device 313 in order to detect a desired horizontal synchronization signal in a current timing window of the filtered CVBS signal according to the threshold Th1. After completing the search of the current timing window, the minimum value found by the minimum search and update device 313 is smaller than the threshold Th1, and thus the position of the desired horizontal synchronization signal is obtained and a new threshold Th1 is generated. When the minimum value is greater than the threshold Th1, it indicates that there is no desired horizontal synchronization signal existed in the timing window.

The timing window counter 317 is connected to the horizontal synchronization detector 315 and the minimum search and update device 313 in order to generate a reset signal according to the position of the newly detected horizontal synchronization signal and output the reset signal to the minimum search and update device 313 for use as a start position of a next timing window. When there is no newly detected horizontal synchronization signal in the current timing window, a new timing window is opened immediately after the current timing window.

Namely, the minimum search and update device 313 searches a timing window for the minimum value and compares the minimum value with the threshold Th1. When the minimum value in the timing window is greater than or equal to the threshold Th1, the minimum search and update device 313 does not perform any update. When the minimum value in the window is smaller than the threshold Th1, the minimum search and update device 313 updates the threshold Th1 and the updated threshold Th1 is the updated minimum value added with a constant selected according to the experience of those skilled in the art.

The subtractor 319 is connected to the horizontal synchronization detector 315 in order to perform a subtraction on the positions of adjacent horizontal synchronization signals so as to generate a first coarse period of the horizontal synchronization signal. As shown in FIG. 5, the first coarse period of the horizontal synchronization signal is obtained by subtracting the time of the position B from the time of the position A and, similarly, another first coarse period of the horizontal synchronization signal is obtained by subtracting the time of the position C from the time of the position B.

Figure 6:
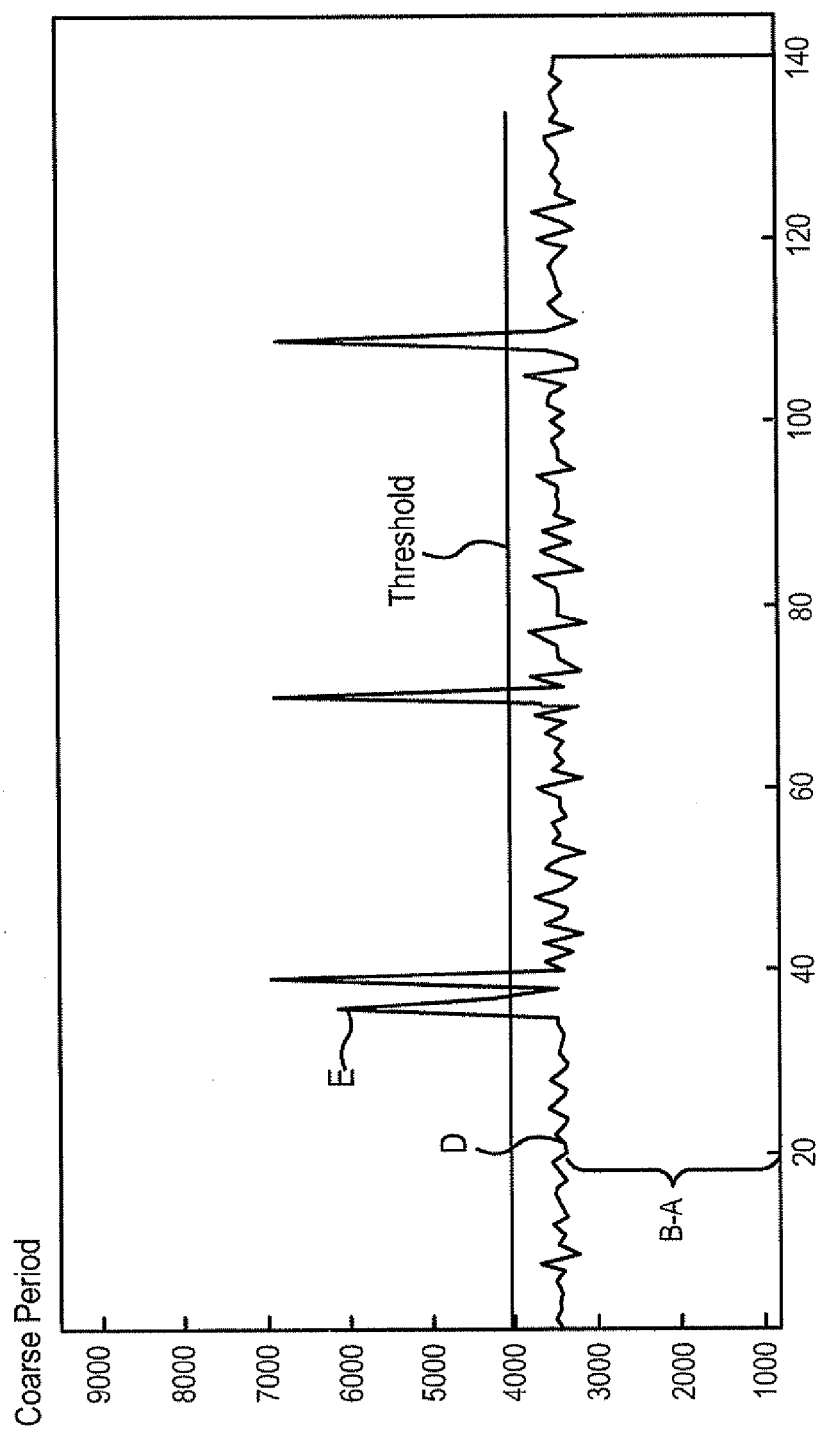
FIG. 6 is a schematic view illustrating an output of a subtractor according to an embodiment of the invention.

FIG. 6 is a schematic view illustrating an output of the subtractor 319 according to an embodiment of the invention, where the horizontal axis indicates the time of a coarse period and the vertical axis indicates the number of points of subtraction. As shown in FIG. 6, position D indicates that in FIG. 5 the time of position B is subtracted from the time of position A, and position E indicates that one or more horizontal signals are not detected, so that the output value of the subtractor 319 is relatively different from the other output values. In this case, the error at position E is distributed over the other positions as the LPF is used immediately, and thus a limiter is used before the LPF is used.

The limiter 321 is connected to the subtractor 319 in order to filter out the periods that are over a limit threshold in the first coarse period of the horizontal synchronization signal and generate a limited coarse period of the horizontal synchronization signal. The limit threshold can be decided by those skilled in the art according to the number of periods defined by the specification.

The second low-pass filter 323 is connected to the limiter 321 in order to filter out the noises and high frequency signals of the limited coarse period of the horizontal synchronization signal to thereby generate the coarse period of the horizontal synchronization signal.

Figure 7:
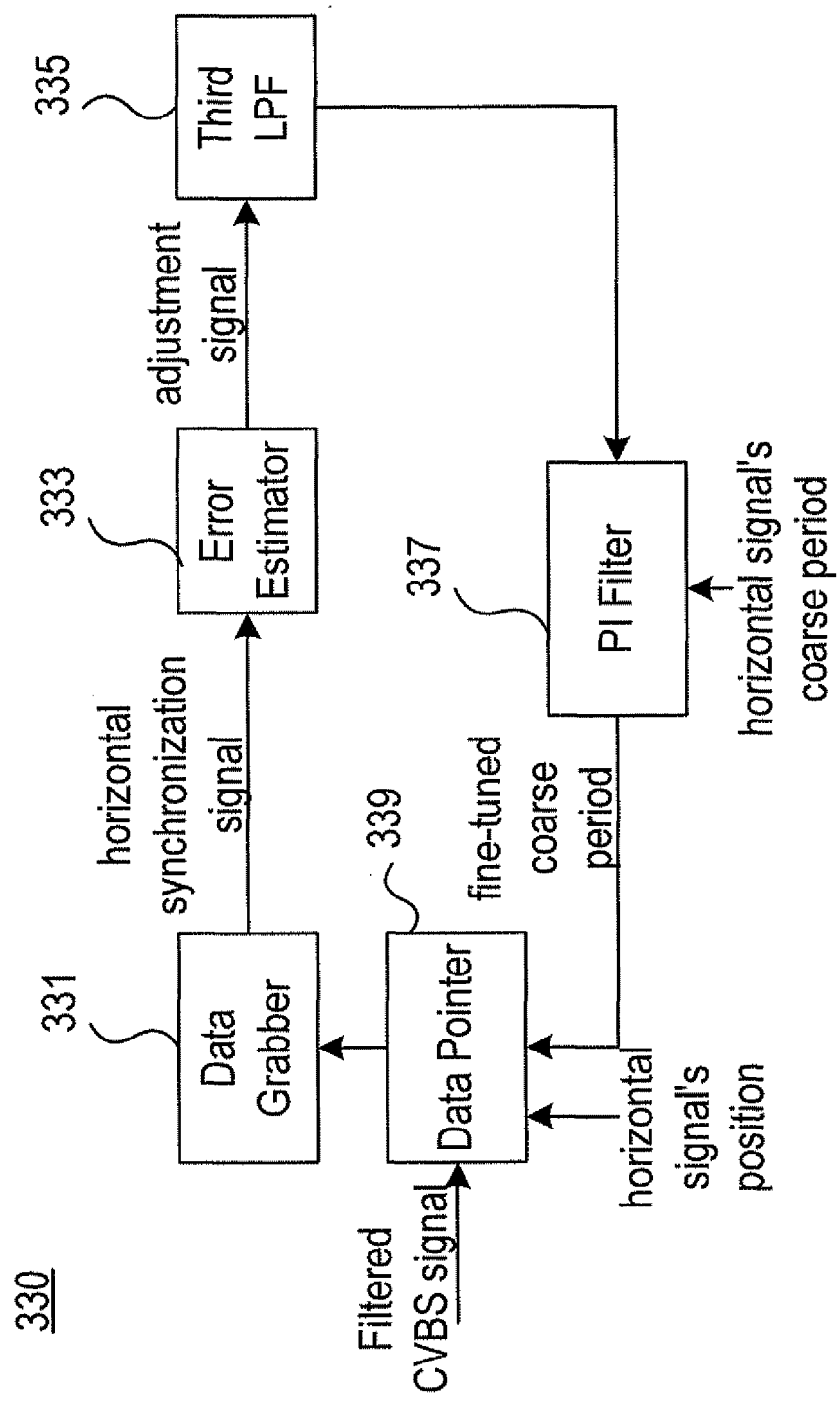
FIG. 7 is a block diagram of a fine period time estimator according to an embodiment of the invention.

FIG. 7 is a block diagram of the fine period time estimator 330 according to an embodiment of the invention. In FIG. 7, the fine period time estimator 330 includes a data grabber 331, an error estimator 333, a third LPF 335, a PI filter 337, and a data pointer 339.

Before the fine period time estimator 330 starts, the position of the horizontal synchronization signal provided by the horizontal synchronization detector 315 is inputted to the data pointer 339 connected to the data grabber 331. The data grabber 331 receives a horizontal signal pointed by the data pointer 339. The coarse period of the horizontal synchronization signal provided by the second LPF 323 is inputted to the PI filter 337, such that the PI filter 337 at starting can output the coarse period of the horizontal synchronization signal to the data pointer 339. The data pointer 339 is based on the position and coarse period of the horizontal synchronization signal to fetch the horizontal synchronization signal of the filtered CVBS outputted by the first LPF.

The error estimator 333 is connected to the data grabber 331 in order to receive a horizontal synchronization signal for error estimation. The error estimator 333 divides the horizontal synchronization signal into two parts, each part accumulating signals for a half of the full time of the horizontal synchronization signal, which are referred to as first signals in a first part and second signals in a second part. The first signals are added to generate a first sum, and the second signals are added to generate a second sum. Since the horizontal synchronization signal has a symmetric shape in the specification, the middle point of the horizontal synchronization signal is located when the first sum and the second sum are equal. On the other hand, the middle point of the horizontal synchronization signal is not located when a difference between the first sum and the second sum is not equal to zero, and the difference can be used as an adjustment signal outputted to the third LPF 335 for generating a magnitude and direction of the fine horizontal synchronization signal.

The third LPF 335 is connected to the error estimator 333 in order to filter out the noises of the adjustment signal to thereby generate a filtered adjustment signal. The PI filter 337 is connected to the third LPF 335 in order to output the fine period to the data pointer 339 for fine-tuning the position of the horizontal synchronization signal in the next period, so the data grabber 331 can grab an appropriate horizontal synchronization signal. Such operations are repeated until the middle point of the horizontal synchronization signal is obtained. When the middle point of the horizontal synchronization signal is located, the full horizontal synchronization signal can be obtained by combining the middle point and time length of the horizontal synchronization signal.

Figure 8:
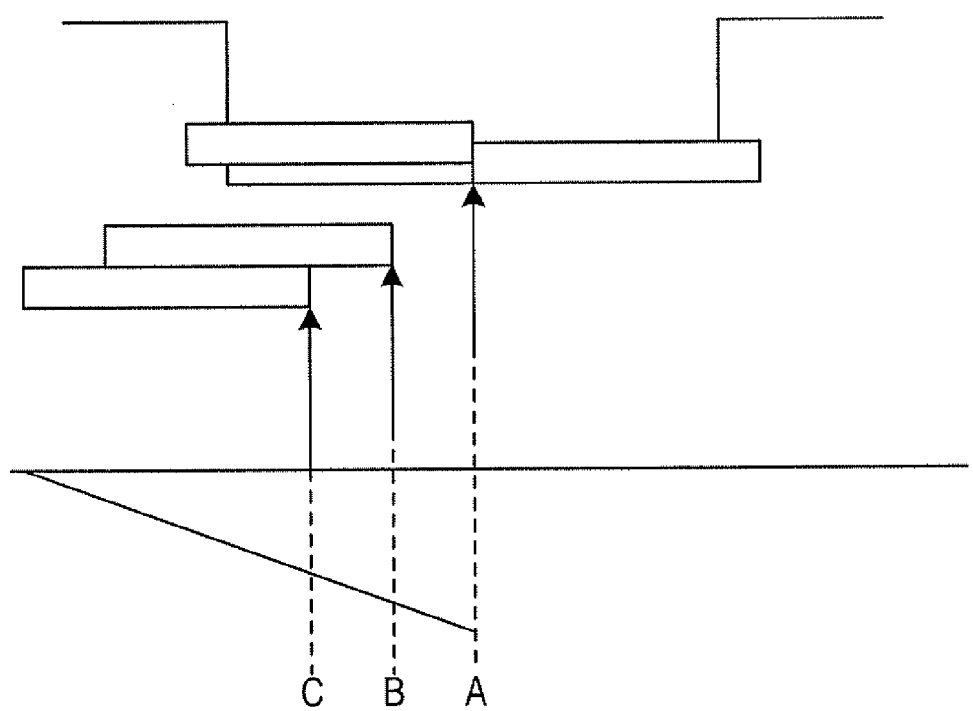
FIG. 8 is a schematic view illustrating an estimated length of a horizontal synchronization signal according to an embodiment of the invention.

The time length of the horizontal synchronization signal can be a time length defined in the specification or be determined by practical signal estimation. If the signal estimation is used, an estimated length for adjustment can be defined as a ratio of the first sum. FIG. 8 is a schematic view illustrating the estimated length of a horizontal synchronization signal according to an embodiment of the invention. As shown in FIG. 8, A, B, and C indicate sums at different positions in the window of the first part, and the length of the window is half of the length of the horizontal synchronization signal. The point A locates at the middle of the horizontal synchronization signal, i.e., the sum of the signals in the window is the maximum negative value. If the sum in the window at the point B is half of the sum in the window at the point A and a ratio equal to a half is defined, the length from the point A to the point B is half of the estimated horizontal synchronization signal length. Similarly, if the ratio is defined to be one third and the sum in the window at the point C is one third of the sum in the window at the point A, the length from the point A to the point C is half of the estimated horizontal synchronization signal length.

Figure 9:
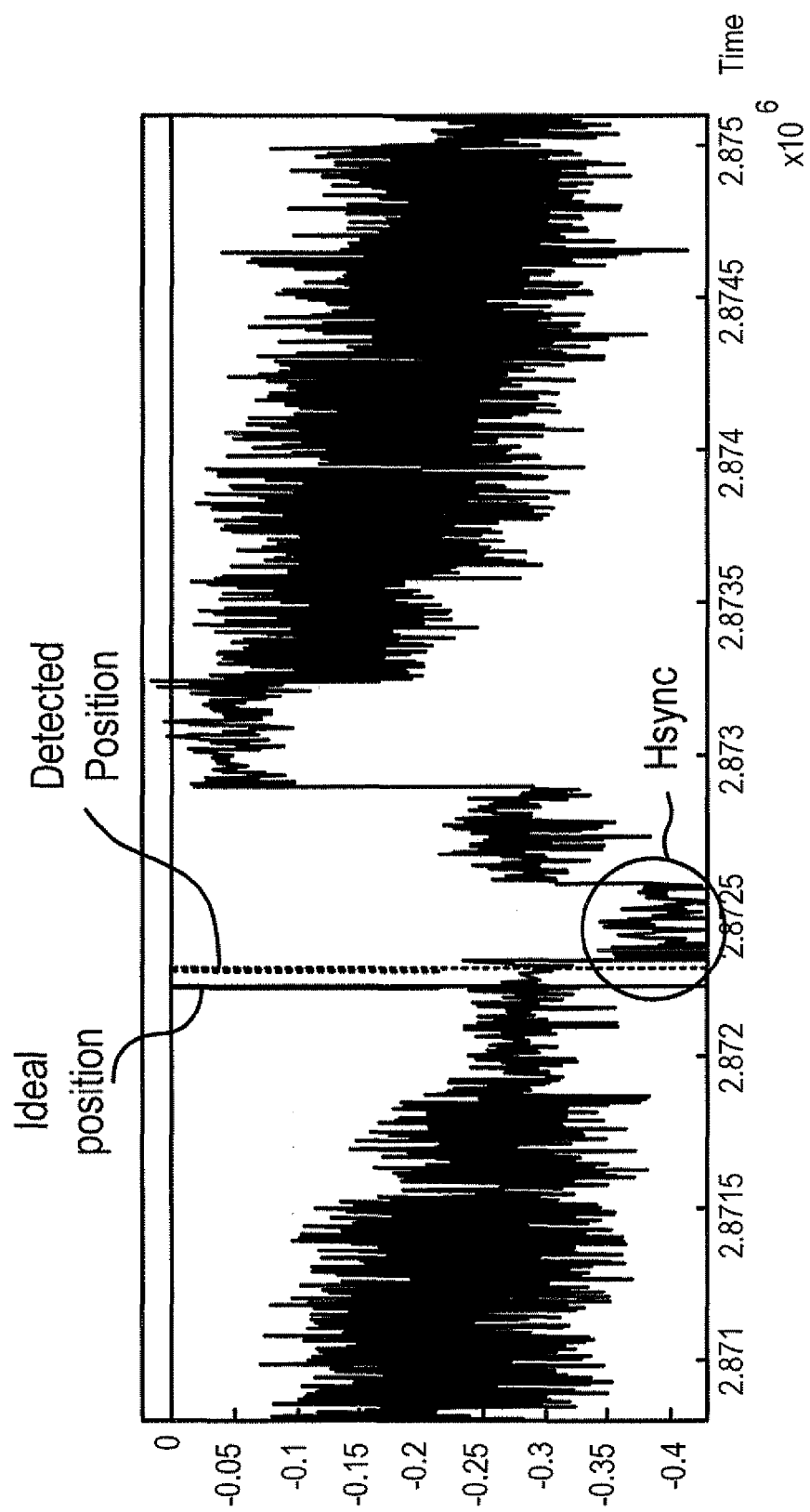
FIG. 9 is a schematic view of a horizontal synchronization signal according to an embodiment of the invention.

FIG. 9 is a schematic view illustrating a horizontal synchronization signal according to an embodiment of the invention. It is known in FIG. 9 that the invention can accurately detect the position of the horizontal synchronization signal, even though there are various noises.

The invention also provides a horizontal synchronization detection method for accurately detecting the position of the horizontal synchronization signal of the color video burst signal (CVBS), which is used with the horizontal synchronization detection system cited above. The method includes the steps as follows:

First, a color video burst signal (CVBS) is received, and the minimum value and corresponding position of each period of the CVBS is estimated to thereby calculate a coarse period of a horizontal synchronization signal.

Next, the coarse period of the horizontal synchronization signal is received, and the horizontal synchronization signal is divided into first signals in a first part and second signals in a second part. The time of accumulating the first signals is a half of the time of the horizontal synchronization signal. The first signals are added to generate a first sum, and the second signals are added to generate a second sum. A middle point of the horizontal synchronization signal is located when the first sum is equal to the second sum. On the other hand, when the first sum is not equal to the second sum, i.e., there is a difference between the first sum and the second sum, the coarse period is fine-tuned to generate a fine-tuned coarse period, and the horizontal synchronization signal is extracted according to the fine-tuned coarse period to thereby determine whether the first sum is equal to the second sum again, which are repeated until the middle point of the horizontal signal is located when the first sum is equal to the second sum.

The description for the operation of the method is the same as that of the system, and thus a detailed description is deemed unnecessary.

As cited, the prior art uses a defined threshold to compare with a CVBS level or amplitude for calculating the period of a horizontal synchronization signal, and when the CVBS level or amplitude is moved to be smaller than the threshold, it is considered that the horizontal synchronization signal is detected. Since a CVBS signal is frequently affected by noise interferences to thus change its amplitude, the horizontal synchronization signal cannot be detected accurately. To overcome this, the prior art is focused on how to find a better threshold or on dynamically changing the threshold for comparison. However, dynamically changing the threshold or other schemes in the prior art are still affected by noise interferences, so that there is a difference between the detected position and the actual position of the horizontal synchronization signal.

The invention is completely different from the prior art in which a threshold is defined and compared with a CVBS amplitude. The invention finds a coarse period of a horizontal synchronization signal and uses the symmetry of the middle point of the horizontal synchronization signal to generate a fine period of the horizontal synchronization signal, which is not likely to be affected by noise interferences and can exactly detect the position of the horizontal synchronization signal, as compared with the prior art.

Although the present invention has been explained in relation to its preferred embodiment, it is to be understood that many other possible modifications and variations can be made without departing from the spirit and scope of the invention as hereinafter claimed.

What is claimed is:

1. A horizontal synchronization signal detection system, comprising:
    a coarse period estimator for receiving a CVBS signal and estimating a minimum value and corresponding position of each period of the CVBS signal to calculate a coarse period of a horizontal synchronization signal; and
    a fine period time estimator for receiving the coarse period of the horizontal synchronization signal and dividing the horizontal synchronization signal into first signals in a first part and second signals in a second part so as to add the first signals to generate a first sum and to add the second signals to generate a second sum,
    wherein a signal accumulation time of each part is half of a time length of the horizontal synchronization signal; the fine period time estimator detects a middle point of the horizontal synchronization signal when the first sum is equal to the second sum; when the first sum minus the second sum is not equal to zero, the steps of fine-tuning the coarse period to generate a fine-tuned coarse period, extracting the horizontal synchronization signal according to the fine-tuned coarse period, and determining whether the first sum is equal to the second sum are repeatedly executed until the first sum is equal to the second sum for indicating that the middle point of the horizontal synchronization signal is detected.

2. The system as claimed in claim 1, wherein the coarse period estimator comprises:
    a first low-pass filter (LPF) for filtering the CVBS signal to generate a filtered CVBS signal;
    a minimum search and update device connected to the first LPF for searching for a minimum value in the filtered CVBS signal and defining a first threshold based on the minimum value to find the minimum value of the filtered CVBS signal in a timing window based on the first threshold;
    a horizontal synchronization detector connected to the minimum search and update device for searching for the horizontal synchronization signal in the filtered CVBS signal based on the first threshold to generate a position of the horizontal synchronization signal;
    a timing window counter connected to the horizontal synchronization detector and the minimum search and update device for generating a reset signal according to the position of the horizontal synchronization signal and outputting the reset signal to the minimum search and update device as a basis of generating a next timing window;
    a subtractor connected to the horizontal synchronization detector for performing a subtraction on positions of adjacent horizontal synchronization signals to generate a first coarse period of the horizontal synchronization signal;
    a limiter connected to the subtractor for filtering out periods that are over a limit threshold in the first coarse period of the horizontal synchronization signal and generating a limited coarse period of the horizontal synchronization signal; and
    a second low-pass filter connected to the limiter for filtering out noises and high frequency signals of the limited coarse period of the horizontal synchronization signal to generate the coarse period of the horizontal synchronization signal.

3. The system as claimed in claim 2, wherein, when the minimum value in the timing window is smaller than the first threshold, the minimum search and update device updates the minimum value in the timing window and adds a constant in the updated minimum value to update the first threshold.

4. The system as claimed in claim 3, wherein the fine period time estimator comprises:
    a data pointer connected to a PI filter, a data grabber, the horizontal synchronization detector and the first LPF for receiving the position of the horizontal synchronization signal outputted by the horizontal synchronization detector, receiving the coarse period of the horizontal synchronization signal and an filtered adjustment signal outputted by the PI filter, outputting the fine-tuned coarse period of the horizontal synchronization signal, receiving the filtered CVBS outputted by the first LPF, and grabbing the horizontal synchronization signal in the filtered CVBS signal based on the position and fine-tuned coarse period of the horizontal synchronization signal for output to the data grabber;

the data grabber connected to the data pointer for receiving the horizontal synchronization signal grabbed by the data pointer;

the PI filter connected to a third LPF, the second LPF and the data pointer for receiving the coarse period of the horizontal synchronization signal outputted by the second LPF, receiving a filtered adjustment signal outputted by the third LPF, and outputting a filtered adjustment signal and the coarse period of the horizontal synchronization signal to the data pointer;

an error estimator connected to the data grabber for receiving the horizontal synchronization signal for an error estimation and dividing the horizontal synchronization signal into the first signals in the first part and the second signals in the second part so as to add the first signals to generate the first sum and to add the second signals to generate the second sum, wherein the signal accumulation time of each part is half of the time length of the horizontal synchronization signal; the middle point of the horizontal synchronization signal is located when the first sum is equal to the second sum so as to generate a fine period of the horizontal synchronization signal; an adjustment signal is generated by performing a subtraction on the first sum and the second sum for output to the third LPF; and the third LPF connected to the error estimator and the PI filter for filtering out noises of the adjustment signal and generate the filtered adjustment signal to the PI filter.

5. A horizontal synchronization signal detection method, comprising the steps of:

receiving a CVBS signal and estimating a minimum value and corresponding position of each period of the CVBS signal so as to calculate a coarse period of a horizontal synchronization signal; and receiving the coarse period of the horizontal synchronization signal and dividing the horizontal synchronization signal into first signals in a first part and second signals in a second part, and adding the first signals to generate a first sum and adding the second signals to generate a second sum, wherein time of accumulating the first signals is a half of time of the horizontal synchronization signal; a middle point of the horizontal synchronization signal is detected when the first sum is equal to the second sum; when the first sum minus the second sum is not equal to zero, steps of fine-tuning the coarse period to generate a fine-tuned coarse period, extracting the horizontal synchronization signal according to the fine-tuned coarse period, and determining whether the first sum is equal to the second sum are repeatedly executed until the first sum is equal to the second sum for indicating that the middle point of the horizontal synchronization signal is located.

6. The method as claimed in claim 5, wherein estimating a minimum value and corresponding position of each period comprises the steps of:

filtering the CVBS signal to generate a filtered CVBS signal;

searching for a minimum value in the filtered CVBS signal and defining a first threshold based on the minimum value to find the minimum value of the filtered CVBS signal in a timing window based on the first threshold;

searching for the horizontal synchronization signal in the filtered CVBS signal based on the first threshold to obtain a position of the horizontal synchronization signal;

generating a reset signal according to the position of the horizontal synchronization signal as a basis of generating a next timing window;

performing a subtraction on positions of adjacent horizontal synchronization signals to generate a first coarse period of the horizontal synchronization signal;

filtering out periods that are over a limit threshold in the first coarse period of the horizontal synchronization signal and generating a limited coarse period of the horizontal synchronization signal; and filtering out noises and high frequency signals of the limited coarse period of the horizontal synchronization signal to generate the coarse period of the horizontal synchronization signal.

7. The method as claimed in claim 6, wherein, when the minimum value in the timing window is smaller than the first threshold, the minimum value in the timing window is updated as an updated minimum value and a constant is added in the updated minimum value to update the first threshold.

8. The method as claimed in claim 7, wherein fine-tuning the coarse period comprises the steps of:

receiving the coarse period of the horizontal synchronization signal and an filtered adjustment signal for fine-tuning the coarse period of the horizontal synchronization signal based on the filtered adjustment signal to generate a fine-tuned coarse period of the horizontal synchronization signal, receiving the position of the horizontal synchronization signal and the filtered CVBS signal to grab the horizontal synchronization signal in the filtered CVBS signal based on the position and fine-tuned coarse period of the horizontal synchronization signal for output;

receiving the horizontal synchronization signal for an error estimation, and dividing the horizontal synchronization signal into the first signals in the first part and the second signals in the second part to add the first signals for generating the first sum and add the second signals for generating the second sum, wherein the signal accumulation time of each part is half of the time length of the horizontal synchronization signal; the middle point of the horizontal synchronization signal is located when the first sum is equal to the second sum, so as to generate a fine period of the horizontal synchronization signal; an adjustment signal is generated by performing a subtraction on the first sum and the second sum;

filtering out noises of the adjustment signal to output a filtered adjustment signal; and repeatedly outputting the fine-tuned coarse period of the horizontal synchronization signal to fine-tune the position of the horizontal synchronization signal in a next period and extract an appropriate horizontal synchronization signal, until the middle point of the horizontal synchronization signal is located.

* * * * *